(12) United States Patent
Na

(10) Patent No.: US 12,485,083 B1
(45) Date of Patent: Dec. 2, 2025

(54) MINERAL COMPONENT EXTRACT FROM BORYEONG MUD, METHOD FOR EXTRACTING THE SAME, AND COSMETIC COMPOSITION CONTAINING BORYEONG MUD MINERAL EXTRACT

(71) Applicant: BMCOS CO., LTD, Boryeong-si (KR)

(72) Inventor: Chul Gyeun Na, Guri-si (KR)

(73) Assignee: BMCOS CO., LTD, Boryeong-si (KR)

( * ) Notice: Subject to any disclaimer, the term of this patent is extended or adjusted under 35 U.S.C. 154(b) by 0 days.

(21) Appl. No.: 18/960,204

(22) Filed: Nov. 26, 2024

(30) Foreign Application Priority Data

Nov. 15, 2024  (KR) .................. 10-2024-0163055

(51) Int. Cl.
| | |
|---|---|
| *A61K 8/96* | (2006.01) |
| *A61K 8/19* | (2006.01) |
| *A61K 8/67* | (2006.01) |
| *A61K 8/73* | (2006.01) |
| *A61K 8/9761* | (2017.01) |
| *A61K 8/9789* | (2017.01) |
| *A61Q 19/00* | (2006.01) |

(52) U.S. Cl.
CPC ............ *A61K 8/965* (2013.01); *A61K 8/19* (2013.01); *A61K 8/675* (2013.01); *A61K 8/735* (2013.01); *A61K 8/9761* (2017.08); *A61K 8/9789* (2017.08); *A61Q 19/007* (2013.01)

(58) Field of Classification Search
None
See application file for complete search history.

(56) References Cited

FOREIGN PATENT DOCUMENTS

| | | | |
|---|---|---|---|
| KR | 10-2001-0079027 A | | 8/2001 |
| KR | 10-2001-0090063 A | | 10/2001 |
| KR | 10-2002-0087590 A | | 11/2002 |
| KR | 20100090533 A | * | 8/2010 |

OTHER PUBLICATIONS https://www.healthline.com/health/beauty-skin-care/skin-care-ingredients-dictionary#a-d (accessed Mar. 21, 2025) (Year: 2025).*
An Office Action mailed by the Korean Intellectual Property Office on Jan. 14, 2025, which corresponds to Korean Patent Application No. 10-2024-0163055 and is related to U.S. Appl. No. 18/960,204.

* cited by examiner

*Primary Examiner* — David J Blanchard
*Assistant Examiner* — Sarah J Chickos
(74) *Attorney, Agent, or Firm* — Studebaker Brackett PLLC

(57) ABSTRACT

The present invention provides a skin elasticity and skin moisturizing functional cosmetic composition containing a Boryeong mud extract.

3 Claims, No Drawings

MINERAL COMPONENT EXTRACT FROM BORYEONG MUD, METHOD FOR EXTRACTING THE SAME, AND COSMETIC COMPOSITION CONTAINING BORYEONG MUD MINERAL EXTRACT

CROSS-REFERENCE SECTION

The present application claims the benefit of priority to Korean Patent Application No. 10-2024-0163055, filed on Nov. 15, 2024, in the Korean Intellectual Property Office. The disclosure of the above-listed application is hereby incorporated by reference herein in its entirety.

BACKGROUND

1. Field

The present invention relates to a mineral component extract from Boryeong mud, a method for extracting the same, and a cosmetic composition containing a Boryeong mud mineral extract.

2. Description of Related Art

Human skin protects a human body from external physical and chemical stimuli and is broadly divided into three layers: the dermis, epidermis, and subcutaneous fat tissue. First, the dermis is composed mainly of fibroblasts that mainly synthesize collagen and other proteins and produce small amounts of lipids. In particular, a matrix protein, which is a component that exists in the dermis layer and fills a space between cells, is largely composed of collagen (90% or more) and elastin (3 to 4%). Skin elasticity may be maintained in the presence of elastic fibers and collagen fibers. The matrix proteins are produced primarily in fibroblasts and decrease by 1% per year with aging. The decrease in matrix proteins reduces the function of each human organ.

Therefore, the weakening of skin cells due to the decrease in matrix proteins in the skin causes a decrease in skin elasticity. The thinning of the dermis layer, which is the most important factor in a loss of the skin elasticity, may be largely divided into three factors: first, a decrease in the number of fibroblasts, which are the main cells of the connective tissue of the dermis layer; second, a decrease in production of proteins such as collagen and elastin, which are produced by fibroblasts and form most of the connective tissue; and third, an increase in degradation of proteins in the connective tissue that are already produced. The matrix proteins are degraded by matrix metalloproteinases (MMPs) such as collagenase, elastase, and gelatinase, and the action of these MMPs is inhibited by tissue inhibitors of metalloproteinases (TIMPs).

In general, human skin loses elasticity and luster with aging, and becomes rough due to keratinization. Clinically, aging is characterized by formation of wrinkles, loss of skin elasticity, and damage and death of skin cells, and histologically, photoaging, which occurs in areas exposed to a lot of sunlight such as the face, the nape of the neck, and the back of the hands, thickens the skin and causes elastosis, which is an accumulation of degenerated elastic fibers. In particular, ultraviolet rays cause a decrease in the amount of hyaluronic acid, resulting in a decrease in the content of moisture in the skin, and cause an increase in transepidermal water loss, resulting in damage to the skin barrier. As a result, the skin becomes rough, the elasticity decreases, and wrinkles are formed. As the aging progresses, the elastic fibers of the skin are degenerated, causing the skin to lose elasticity or sag.

The rate and degree of skin aging vary depending on various factors such as genetic factors, the degree of exposure to ultraviolet rays, and the production of active oxygen due to physical and chemical stress. Therefore, efforts are generally made to externally supply nutrients that may prevent the aging process in order to maintain young and elastic skin.

Meanwhile, mud generally contains a large amount of various active ingredients such as natural minerals that prevent skin aging, and is rich in minerals that provide vitality and elasticity to the skin, helping to keep the skin young and fresh. In addition, mud may be used in physical therapeutic methods such as sand baths or saunas since it contains colloids and crystalline components, and mud is significantly effective in treating external wounds since it has antibacterial and antifungal effects.

In addition, mud activates cell activity by emitting far-infrared rays, expands capillaries, promotes blood circulation and metabolism, and eliminates various waste products from the skin, making each cell in the human body healthy and vibrant.

Due to the properties of mud, various cosmetic techniques using mud have been studied, and examples thereof include "COMPOSITION FOR PRODUCING COSMETIC RAW MATERIAL MUD EMITTING FAR-INFRARED ENERGY" of Korean Patent Laid-Open Publication No. 2002-0087590 (Nov. 23, 2002) and "COMPOSITION OF MUD PACK" of Korean Patent Laid-Open Publication No. 2001-0090063 (Oct. 18, 2001).

SUMMARY

An object of the present invention is to provide a cosmetic composition that improves moisturizing ability of the skin and increases elasticity by using mud, particularly, Boryeong mud that has a composition of 1.47% of Na, 0.71% of Mg, 8.89% of Al, 31.52% of Si, 3.61% of K, 0.70% of Ca, 0.54% of Ti, 4.46% of Fe, and 48.10% of O, and is known to have a far-infrared ray generation effect that is superior to that of regular mud, helping to soothe the skin and relieve freckles and acne, and helping with skin regeneration and blood circulation.

Another object of the present invention is to provide a mineral component extract from Boryeong mud, a method for extracting the same, and a cosmetic composition containing a Boryeong mud mineral extract.

The objects of the present invention are not limited to the above-mentioned objects, and other objects that are not mentioned may be obviously understood by those skilled in the art from the following specification.

In one general aspect, a skin elasticity and skin moisturizing functional cosmetic composition contains a Boryeong mud extract.

The cosmetic composition contains 8 to 12 parts by weight of a Boryeong mud extract, 1 to 3 parts by weight of a *Sophora japonica* flower extract, 1 to 3 parts by weight of a *Centaurea cyanus* flower extract, 1 to 3 parts by weight of a *Matricaria* flower extract, 1 to 3 parts by weight of a *Pancratium maritimum* extract, 0.8 to 1.2 parts by weight of a pear extract, 0.8 to 1.2 parts by weight of a Japanese apricot extract, 0.8 to 1.2 parts by weight of a cypress leaf extract, 0.8 to 1.2 parts by weight of a gold extract, 2 to 4 parts by weight of glycerin, 0.8 to 1.2 parts by weight of niacinamide, 0.8 to 1.2 parts by weight of sodium chloride, 0.8 to 1.2 parts by weight of butylene glycol, 0.8 to 1.2 parts by weight of hexylene glycol, 0.8 to 1.2 parts by weight of 1,2-hexanediol, 0.8 to 1.2 parts by weight of caprylyl glycol, 1 to 3 parts by weight of allantoin, 1 to 3 parts by weight of citric acid, 0.8 to 1.2 parts by weight of disodium EDTA, 0.8 to 1.2 parts by weight of pentylene glycol, 0.8 to 1.2 parts by weight of sodium hyaluronate, 0.8 to 1.2 parts by weight of polyhydroxystearic acid, 0.8 to 1.2 parts by weight of ethylhexylglycerin, 0.8 to 1.2 parts by weight of hydrolyzed sodium hyaluronate, 0.8 to 1.2 parts by weight of limonene, and 56 to 60 parts by weight of purified water.

The cosmetic composition further contains 3 to 7 parts by weight of a multifunctional extract, and
the multifunctional extract is prepared by performing:
pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of purified water, adding 0.8 to 1.2 parts by weight of a *saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract.

The cosmetic composition further contains 3 to 7 parts by weight of a multifunctional extract,
the multifunctional extract is prepared by performing:
pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and performing aging at a temperature of 6 to 10° C. for 13 to 17 hours; after the aging, performing filtration to obtain a filtrate, mixing 48 to 52 parts by weight of the filtrate and 48 to 52 parts by weight of purified water, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract, and
the aged extract is prepared by performing:
washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and performing aging at a temperature of 18 to 22° C. for 5 to 7 hours; after the aging, heating the mineral mixture at a temperature of 88 to 92° C. for 11 to 13 hours and performing extraction through ultrasonic irradiation; and after the extraction, performing filtration to obtain a filtrate.

The cosmetic composition further contains 3 to 7 parts by weight of a multifunctional extract,
the multifunctional extract is prepared by performing:
pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and performing aging at a temperature of 6 to 10° C. for 13 to 17 hours; after the aging, performing heating to a temperature of 68 to 72° C. and then performing cooling; after the cooling, adding 8 to 12 parts by weight of an aged extract, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract, and
the aged extract is prepared by performing:
washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and performing aging at a temperature of 18 to 22° C. for 5 to 7 hours; after the aging, heating the mineral mixture at a temperature of 88 to 92° C. for 11 to 13 hours and performing extraction through ultrasonic irradiation; and after the extraction, performing filtration to obtain a filtrate.

In another general aspect, a method for preparing a skin elasticity and skin moisturizing functional cosmetic composition includes:
preparing an aged extract including: washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and performing aging at a temperature of 18 to 22° C. for 5 to 7 hours; after the aging, heating the mineral mixture at a temperature of 88 to 92° C. for 11 to 13 hours and performing extraction through ultrasonic irradiation; and after the extraction, performing filtration to obtain a filtrate;
preparing a multifunctional extract including: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of the aged extract, and performing aging at a temperature of 6 to 10° C. for 13 to 17 hours;

after the aging, performing heating to a temperature of 68 to 72° C. and then performing cooling; after the cooling, adding 8 to 12 parts by weight of the aged extract, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract; and mixing 3 to 7 parts by weight of the multifunctional extract, 8 to 12 parts by weight of a Boryeong mud extract, 1 to 3 parts by weight of a *Sophora japonica* flower extract, 1 to 3 parts by weight of a *Centaurea cyanus* flower extract, 1 to 3 parts by weight of a *Matricaria* flower extract, 1 to 3 parts by weight of a *Pancratium maritimum* extract, 0.8 to 1.2 parts by weight of a pear extract, 0.8 to 1.2 parts by weight of a Japanese apricot extract, 0.8 to 1.2 parts by weight of a cypress leaf extract, 0.8 to 1.2 parts by weight of a gold extract, 2 to 4 parts by weight of glycerin, 0.8 to 1.2 parts by weight of niacinamide, 0.8 to 1.2 parts by weight of sodium chloride, 0.8 to 1.2 parts by weight of butylene glycol, 0.8 to 1.2 parts by weight of hexylene glycol, 0.8 to 1.2 parts by weight of 1,2-hexanediol, 0.8 to 1.2 parts by weight of caprylyl glycol, 1 to 3 parts by weight of allantoin, 1 to 3 parts by weight of citric acid, 0.8 to 1.2 parts by weight of disodium EDTA, 0.8 to 1.2 parts by weight of pentylene glycol, 0.8 to 1.2 parts by weight of sodium hyaluronate, 0.8 to 1.2 parts by weight of polyhydroxystearic acid, 0.8 to 1.2 parts by weight of ethylhexylglycerin, 0.8 to 1.2 parts by weight of hydrolyzed sodium hyaluronate, 0.8 to 1.2 parts by weight of limonene, and 56 to 60 parts by weight of purified water.

DETAILED DESCRIPTION

Hereinafter, various exemplary embodiments will be described in more detail. The exemplary embodiments described in the present specification may be variously modified. Specific exemplary embodiments may be described in detail in the detailed description. However, the disclosed specific exemplary embodiments may be only for easy understanding of various exemplary embodiments. Therefore, it should be understood that the technical idea is not limited by the disclosed specific exemplary embodiments and all equivalents or substitutes included in the spirit and technical scope of the invention are included.

Terms including ordinal numbers such as primary, secondary, first, and second may be used for describing various elements, but these elements are not limited by the terms described above. The terms described above are used only to distinguish one element from other elements.

It will be understood that the terms "comprise (s)" or "have (has)" used in the present specification, specify the presence of features, numerals, steps, operations, elements, parts mentioned in the present specification, or a combination thereof, but do not preclude the presence or addition of one or more other features, numerals, steps, operations, elements, parts, or a combination thereof. It is to be understood that when one element is referred to as being "connected to" or "coupled to" another element, it may be connected directly to or coupled directly to another element or be connected to or coupled to another element having the other element intervening therebetween. On the other hand, it is to be understood that when one element is referred to as being "connected directly to" or "coupled directly to" another element, it may be connected to or coupled to another element without the other element interposed therebetween.

Further, in the description of the present invention, when it is determined that the detailed description of the known function or configuration related to the present invention may obscure the gist of the present invention, the detailed description thereof will be abbreviated or omitted.

The present invention provides a skin elasticity and skin moisturizing functional cosmetic composition containing a Boryeong mud extract.

Hereinafter, the functional cosmetic composition according to the present invention will be described in detail.

Boryeong mud contains mineral components such as silicon (66%), aluminum (16%), iron (5%), potassium (5%), sodium (4%), magnesium (3%), titanium (1%), and sulfur (1%), and a skin elasticity and skin moisturizing functional cosmetic composition may be provided using a Boryeong mud extract containing mineral components obtained by extracting Boryeong mud.

The Boryeong mud extract may be extracted by an extraction method using a mechanical and chemical ball milling process, may be obtained by precipitating an extract containing mineral components in an extraction solution, and may be obtained using a solvent extractant such as 2EHPA, Cyanex 272, or Cyphos.

The cosmetic composition preferably contains 8 to 12 parts by weight of a Boryeong mud extract, 1 to 3 parts by weight of a *Sophora japonica* flower extract, 1 to 3 parts by weight of a *Centaurea cyanus* flower extract, 1 to 3 parts by weight of a *Matricaria* flower extract, 1 to 3 parts by weight of a *Pancratium maritimum* extract, 0.8 to 1.2 parts by weight of a pear extract, 0.8 to 1.2 parts by weight of a Japanese apricot extract, 0.8 to 1.2 parts by weight of a cypress leaf extract, 0.8 to 1.2 parts by weight of a gold extract, 2 to 4 parts by weight of glycerin, 0.8 to 1.2 parts by weight of niacinamide, 0.8 to 1.2 parts by weight of sodium chloride, 0.8 to 1.2 parts by weight of butylene glycol, 0.8 to 1.2 parts by weight of hexylene glycol, 0.8 to 1.2 parts by weight of 1,2-hexanediol, 0.8 to 1.2 parts by weight of caprylyl glycol, 1 to 3 parts by weight of allantoin, 1 to 3 parts by weight of citric acid, 0.8 to 1.2 parts by weight of disodium EDTA, 0.8 to 1.2 parts by weight of pentylene glycol, 0.8 to 1.2 parts by weight of sodium hyaluronate, 0.8 to 1.2 parts by weight of polyhydroxystearic acid, 0.8 to 1.2 parts by weight of ethylhexylglycerin, 0.8 to 1.2 parts by weight of hydrolyzed sodium hyaluronate, 0.8 to 1.2 parts by weight of limonene, and 56 to 60 parts by weight of purified water.

The *Sophora japonica* flower extract is extracted from the *Sophora Japonica* flower. The *Sophora Japonica* flower is the flower of *Sophora Japonica*, which is a deciduous broad-leaved tree belonging to Fabaceae, growing to a height of about 25 m and having a twig that is green and emits an odor when cut. It is known that *Sophora Japonica* is effective for circulatory system diseases such as arteriosclerosis, intestinal bleeding, uterine bleeding, gingivitis, boils, burns, high blood pressure, cerebral hemorrhage, stroke, and paralysis of hands and feet, and hemorrhoids and anal fistula pain. The *Sophora japonica* flower contains Troxerutin as an active ingredient. As the cosmetic composition contains the *Sophora japonica* flower extract, skin moisturizing functionality and skin elasticity functionality may be secured.

The *Centaurea cyanus* flower extract is extracted from the *Centaurea cyanus* flower, and *Centaurea cyanus* helps to refresh the skin and is particularly effective for dry skin. Further, an extract of the flower is used as an acidic toner due to its astringent properties, and an extract of the leaf is used as an eye drop when the eyes are tired and inflamed. As the cosmetic composition contains the *Centaurea cyanus* flower extract, skin moisturizing functionality and skin elasticity functionality may be secured.

As the cosmetic composition contains the *Matricaria* flower extract, the *Pancratium maritimum* extract, the pear extract, the Japanese apricot extract, the cypress leaf extract, and the gold extract, the functionality may be further improved.

In addition, the cosmetic composition preferably further contains 3 to 7 parts by weight of a multifunctional extract, and more preferably further contains 4 to 6 parts by weight of a multifunctional extract.

The multifunctional extract may be prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of purified water, adding 0.8 to 1.2 parts by weight of a *saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract.

In addition, the multifunctional extract is preferably prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and performing aging at a temperature of 6 to 10° C. for 13 to 17 hours; after the aging, performing filtration to obtain a filtrate, mixing 48 to 52 parts by weight of the filtrate and 48 to 52 parts by weight of purified water, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract.

Further, the multifunctional extract is more preferably prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and performing aging at a temperature of 6 to 10° C. for 13 to 17 hours; after the aging, performing heating to a temperature of 68 to 72° C. and then performing cooling; after the cooling, adding 8 to 12 parts by weight of an aged extract, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract.

*Tubocapsicum anomalum* is a perennial plant belonging to Solanaceae that grows in Korea, Japan, and the central and southern region of Taiwan, as well as in India and Africa. The flowers bloom from July to August and are light yellow, 1 to 5 flowers bloom at each leaf axil, and the pedicel becomes thicker and curves downwards when the fruit ripens and has a length of 1.5 to 2.5 cm. The sepal is cup-shaped and has the upper margin that is horizontal, hairless, and low, the corolla is bell-shaped and shallowly divided into five lobes, and the lobe is lanceolate-triangular, pointed at the tip, and tilted.

Oregano, which is an herb belonging to Lamiaceae and is a medicinal herb with a unique fragrance, is a shrub or plant with a square stem and mostly single leaves, and is cultivated for ornamental purposes and is also widely used as a raw material for spices due to its beautiful flowers and fragrance. Further, oregano contains a lot of phenolic compounds, particularly, rosmarinic acid, and is reported to have anti-inflammatory, antioxidant, antibacterial, antifungal, and antiviral properties.

*Psalliota campestris* grows in colonies in Korea, mainly in humus-rich bare lands from summer and fall. The cap has a diameter of 35 to 105 mm and is hemispherical or flat. The surface of the cap is white, dark yellow, or yellowish brown, and is smooth or has fibrous bast. The tissue is white, but turns red when bruised. The gills are separated and dense, and are initially white or pink, and then turn red-brown and finally dark brown. The stipe is white, but turns brown when bruised, and has a white membrane-like ring on the upper portion (National Institute of Biological Resources).

In the present invention, the multifunctional extract obtained by aging, fermenting, and extracting *Tubocapsicum anomalum*, oregano, and *Psalliota campestris* is applied to the functional cosmetic composition, the multifunctional extract is prepared by aging a raw material using an aged extract prepared by aging and extracting scoria and olivine, fermenting the aged raw material using the aged extract and a *Saccharomyces bayanus* strain, and extracting the fermented product to increase the functional ingredients of the raw material and also maximize extraction efficiency. Accordingly, the functional ingredients of the multifunctional extract are contained in an excessive amount, such that the functionality may be maximized when applied to a cosmetic composition.

The aged extract is prepared by performing: washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and performing aging at a temperature of 18 to 22° C. for 5 to 7 hours; after the aging, heating the mineral mixture at a temperature of 88 to 92° C. for 11 to 13 hours and performing extraction through ultrasonic irradiation; and after the extraction, performing filtration to obtain a filtrate.

Scoria refers to volcanic soil having a high porosity, which is formed of a sintered body obtained by sintering of a mixture of porous volcanic rock, volcanic sand, and other volcanic ash, among various materials ejected during a volcanic eruption, at a high temperature. Scoria constitutes a parasitic cone (oreum), is distributed throughout JeJu in Korea, and is largely classified into reddish brown, yellowish brown, black, and dark gray colors, and reddish brown scoria is most commonly distributed. In Jeju, which has a hot and humid environment, from early times, scoria has been used on the roofs and inner and outer walls of houses as a heat-reserving, heat-insulating, sound-proofing, and moisture-proofing agent, and has been widely used on yard roads to prevent radiation heat, as well as to prevent muddy water from splashing during rain and to be used as a filter. Recently, scoria has been developed as a soil conditioner, a fertilizer additive, a feed additive, a natural dye, and a cosmetic raw material.

Olivine is known to have an excellent far-infrared ray emission effect.

The present invention provides a method for preparing a skin elasticity and skin moisturizing functional cosmetic composition, the method including:

preparing an aged extract including: washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and performing aging at a temperature of 18 to 22° C. for 5 to 7 hours; after the aging, heating the mineral mixture at a temperature of 88 to 92° C. for 11 to 13 hours and performing extraction through ultrasonic irradiation; and after the extraction, performing filtration to obtain a filtrate;

preparing a multifunctional extract including: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of the aged extract, and performing aging at a temperature of 6 to 10° C. for 13 to 17 hours; after the aging, performing heating to a temperature of 68 to 72° C. and then performing cooling; after the cooling, adding 8 to 12 parts by weight of the aged extract, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract; and mixing 3 to 7 parts by weight of the multifunctional extract, 8 to 12 parts by weight of a Boryeong mud extract, 1 to 3 parts by weight of a *Sophora japonica* flower extract, 1 to 3 parts by weight of a *Centaurea cyanus* flower extract, 1 to 3 parts by weight of a *Matricaria* flower extract, 1 to 3 parts by weight of a *Pancratium maritimum* extract, 0.8 to 1.2 parts by weight of a pear extract, 0.8 to 1.2 parts by weight of a Japanese apricot extract, 0.8 to 1.2 parts by weight of a cypress leaf extract, 0.8 to 1.2 parts by weight of a gold extract, 2 to 4 parts by weight of glycerin, 0.8 to 1.2 parts by weight of niacinamide, 0.8 to 1.2 parts by weight of sodium chloride, 0.8 to 1.2 parts by weight of butylene glycol, 0.8 to 1.2 parts by weight of hexylene glycol, 0.8 to 1.2 parts by weight of 1,2-hexanediol, 0.8 to 1.2 parts by weight of caprylyl glycol, 1 to 3 parts by weight of allantoin, 1 to 3 parts by weight of citric acid, 0.8 to 1.2 parts by weight of disodium EDTA, 0.8 to 1.2 parts by weight of pentylene glycol, 0.8 to 1.2 parts by weight of sodium hyaluronate, 0.8 to 1.2 parts by weight of polyhydroxystearic acid, 0.8 to 1.2 parts by weight of ethylhexylglycerin, 0.8 to 1.2 parts by weight of hydrolyzed sodium hyaluronate, 0.8 to 1.2 parts by weight of limonene, and 56 to 60 parts by weight of purified water.

The functional cosmetic composition prepared by the preparation method according to the present invention has the effect of improving skin moisturizing ability and increasing skin elasticity.

Hereinafter, the present invention will be described in more detail by the following examples.

However, the following examples are only illustrative of the content of the present invention, and the scope of the invention is not limited by the examples and the experimental examples.

<Preparation Example 1> Preparation 1 of Multifunctional Extract

*Tubocapsicum anomalum*, oregano, and *Psalliota campestris* were pretreated by performing washing and steaming at a temperature of 70° C. for 3 hours. 50 parts by weight of a mixture obtained by mixing the pretreated *Tubocapsicum anomalum*, oregano, and *Psalliota campestris* at a weight ratio of 1:1:1 and 50 parts by weight of purified water were mixed, 1 part by weight of a *Saccharomyces bayanus* strain was added, and then fermentation was performed at a temperature of 33° C. for 7 days. After the fermentation, filtration was performed to obtain a fermented product, 10 parts by weight of the fermented product and 90 parts by weight of purified water were added, and extraction was performed at a temperature of 120° C. for 9 hours, thereby preparing an extract. The extract was concentrated under reduced pressure and freeze-dried to prepare a multifunctional extract.

<Preparation Example 2> Preparation 2 of Multifunctional Extract

Scoria and olivine were washed, the washed scoria and olivine were heat-treated at a temperature of 140° C., and 35 parts by weight of minerals obtained by mixing the heat-treated scoria and olivine at a weight ratio of 1:1 and 65 parts by weight of purified water were mixed, thereby preparing a mineral mixture. The minerals in the mineral mixture were crushed to powder the minerals, and aging was performed at a temperature of 20° C. for 6 hours. After the aging, the mineral mixture was heated at a temperature of 90° C. for 12 hours, and extraction was performed through ultrasonic irradiation. After the extraction, filtration was performed to prepare an aged extract.

*Tubocapsicum anomalum*, oregano, and *Psalliota campestris* were pretreated by performing washing and steaming at a temperature of 70° C. for 3 hours. 50 parts by weight of a mixture obtained by mixing the pretreated *Tubocapsicum anomalum*, oregano, and *Psalliota campestris* at a weight ratio of 1:1:1 and 50 parts by weight of the aged extract were mixed, and aging was performed at a temperature of 8° C. for 15 hours. After the aging, filtration was performed to obtain a filtrate, 50 parts by weight of the filtrate and 50 parts by weight of purified water were mixed, 1 part by weight of a *Saccharomyces bayanus* strain was added, and then, fermentation was performed at a temperature of 33° C. for 7 days. After the fermentation, filtration was performed to obtain a fermented product, 10 parts by weight of the fermented product and 90 parts by weight of purified water were added, and extraction was performed at a temperature of 120° C. for 9 hours, thereby preparing an extract. The extract was concentrated under reduced pressure and freeze-dried to prepare a multifunctional extract.

<Preparation Example 3> Preparation 3 of Multifunctional Extract

Scoria and olivine were washed, the washed scoria and olivine were heat-treated at a temperature of 140° C., and 35 parts by weight of minerals obtained by mixing the heat-treated scoria and olivine at a weight ratio of 1:1 and 65 parts by weight of purified water were mixed, thereby preparing a mineral mixture. The minerals in the mineral mixture were crushed to powder the minerals, and aging was performed at a temperature of 20° C. for 6 hours. After the aging, the mineral mixture was heated at a temperature of 90° C. for 12 hours, and extraction was performed through ultrasonic irradiation. After the extraction, filtration was performed to prepare an aged extract.

*Tubocapsicum anomalum*, oregano, and *Psalliota campestris* were pretreated by performing washing and steaming at a temperature of 70° C. for 3 hours. 50 parts by weight of a mixture obtained by mixing the pretreated *Tubocapsicum anomalum*, oregano, and *Psalliota campestris* at a weight ratio of 1:1:1 and 50 parts by weight of the aged extract were mixed, and aging was performed at a temperature of 8° C. for 15 hours. After the aging, heating was performed to a temperature of 70° C., and cooling was performed. After the cooling, 10 parts by weight of the aged extract was added, 1 part by weight of a *Saccharomyces bayanus* strain was added, and then, fermentation was performed at a temperature of 33° C. for 7 days. After the fermentation, filtration was performed to obtain a fermented product, 10 parts by weight of the fermented product and 90 parts by weight of purified water were added, and extraction was performed at a temperature of 120° C. for 9 hours, thereby preparing an extract. The extract was concentrated under reduced pressure and freeze-dried to prepare a multifunctional extract.

<Experimental Example 1> Component Analysis

In order to analyze the polyphenol content and flavonoid content of each of the multifunctional extracts prepared in Preparation Examples 1 to 3, high-performance liquid chromatography (HPLC) analysis was performed. The total polyphenol content and total flavonoid content are shown in Table 1.

TABLE 1

|  | Total polyphenol content (mg/g) | Total flavonoid content (mg/g) |
|---|---|---|
| Preparation Example 1 | 174.38 | 40.27 |
| Preparation Example 2 | 214.77 | 46.48 |
| Preparation Example 3 | 286.68 | 58.30 |

As shown in Table 1, it was confirmed that the multifunctional extract according to the present invention had a high total polyphenol content and a high total flavonoid content.

<Experimental Example 2> Antioxidant Functional Analysis

The multifunctional extracts prepared in Preparation Examples 1 to 3 were used as samples, and antioxidant power was measured by 2,2-diphenyl-1-picrylhydrazyl (DPPH) radical scavenging activity. As for the DPPH radical scavenging activity, the method of Mensor et al. was referred to. 80 µl of a 0.2 mM DPPH ethanol solution was added to each of the samples by 20 µl, the mixture was stirred for 1 minute and then reacted in an incubator at 25° C. for 10 minutes, and then absorbance at 517 nm was measured using an ELISA reader. The DPPH radical scavenging activity was expressed as a percentage according to the following Equation 1. The results are shown in Table 2.

$$DPPH \text{ radical scavenging activity } (\%) = \frac{(1 - \text{Absorbance when sample is added})}{\text{Absorbance of control}} \times 100 \quad <\text{Equation 1}>$$

TABLE 2

|  | Antioxidant effect (DPPH radical scavenging activity, %) |
|---|---|
| Preparation Example 1 | 58.2 |
| Preparation Example 2 | 62.7 |
| Preparation Example 3 | 66.9 |

As shown in Table 2, the multifunctional extract according to the present invention was measured to have a high DPPH radical scavenging activity value, confirming that the multifunctional extract has excellent antioxidant functionality.

<Experimental Example 3> Rate of Increase in Collagen Analysis

In order to confirm the functionality of the multifunctional extracts prepared in Preparation Examples 1 to 3, the following experiment was performed.

Human-derived fibroblasts were dispensed into a 24-well plate for cell culture and cultured in a medium containing 10% fetal bovine serum (FBS) at 37° C. under 5% $CO_2$ for 24 hours, and then, the cultured cells were washed twice with phosphate buffer saline (PBS). The fibroblasts cultured according to the above method and a medium containing 1% FBS were treated with each of the extracts of Preparation Examples 1 to 3 as a sample so that a final concentration was 0.001 w/v %, 2 µCi of amino acid (2,3-3H proline) labeled with radioisotopes and 30 µg/ml of ascorbic acid were added, the cells were cultured at 37° C. under 5% $CO_2$ for 24 hours, and then, the culture was terminated. After the culture was completed, the cells and culture medium were each divided in ½, only one fraction was treated with collagenase, proteins were precipitated with trichloroacetic acid (TCA), and then, the amount of biosynthesized collagen was measured from a difference in radioactivity between the two fractions. The collagen biosynthesis promotion effect of each sample is shown in Table 3 as the rate of increase in collagen based on the control with nothing added as 100%.

TABLE 3

|  | Rate of increase in collagen (8) |
| --- | --- |
| Control | 100.0 |
| Preparation Example 1 | 210.8 |
| Preparation Example 2 | 238.8 |
| Preparation Example 3 | 285.5 |

As shown in Table 3, it was confirmed that, when the multifunctional extract according to the present invention was applied, an excellent collagen biosynthesis promotion effect was obtained.

<Example 1> Preparation 1 of Functional Cosmetic Composition

A functional cosmetic composition was prepared by mixing 10 parts by weight of a Boryeong mud extract, 2 parts by weight of a *Sophora japonica* flower extract, 2 parts by weight of a *Centaurea cyanus* flower extract, 2 parts by weight of a *Matricaria* flower extract, 2 parts by weight of a *Pancratium maritimum* extract, 1 part by weight of a pear extract, 1 part by weight of a Japanese apricot extract, 1 part by weight of a cypress leaf extract, 1 part by weight of a gold extract, 3 parts by weight of glycerin, 1 part by weight of niacinamide, 1 part by weight of sodium chloride, 1 part by weight of butylene glycol, 1 part by weight of hexylene glycol, 1 part by weight of 1,2-hexanediol, 1 part by weight of caprylyl glycol, 2 parts by weight of allantoin, 2 parts by weight of citric acid, 1 part by weight of disodium EDTA, 1 part by weight of pentylene glycol, 1 part by weight of sodium hyaluronate, 1 part by weight of polyhydroxystearic acid, 1 part by weight of ethylhexylglycerin, 1 part by weight of hydrolyzed sodium hyaluronate, 1 part by weight of limonene, and 58 parts by weight of purified water.

<Example 2> Preparation 2 of Functional Cosmetic Composition

A functional cosmetic composition was prepared by adding and mixing 5 parts by weight of the multifunctional extract prepared in Preparation Example 3 to the functional cosmetic composition of Example 1.

<Experimental Example 4> Skin Elasticity and Skin Moisturizing Functionality Analysis 1. Amount of Water Loss Analysis For twenty-five adult men and women aged 25 to 40 years with dry skin, the inner side of the lower left arm was divided into 2×2 cm² sections, a transepidermal water loss (TEWL) was measured three times for each section, and then, the cosmetic composition of each of Examples 1 and 2 was applied onto the inner side of the lower left arm twice daily for four weeks. Each cosmetic composition was applied twice daily at a dosage of 50 µg for one week, and the amount of transepidermal water loss (TEWL) was measured. The measurement was conducted in a constant temperature and humidity room with an indoor temperature of 24±2° C. and a relative humidity of 40±2° C., and the average value obtained by measuring three times under each condition was used. To show the resulting values, the amounts of water loss after 3 days and 7 days of application are shown in Table 4 based on the transepidermal water loss before the initial application of the cosmetic composition of each of Examples 1 and 2 as 100%.

TABLE 4

|  | Amount of water loss (%) | | |
| --- | --- | --- | --- |
|  | Before application | After 3 days | After 7 days |
| Example 1 | 100 | 62 | 50 |
| Example 2 | 100 | 50 | 38 |

As shown in Table 4, it was confirmed that the functional cosmetic composition according to the present invention had an excellent effect in suppressing transepidermal water loss.

2. Skin Moisturizing Ability Analysis

For forty adult men and women aged 25 to 40 years with dry skin, the functional cosmetic composition of each of Examples 1 and 2 was applied to the face twice daily for four weeks. The subjects were divided into two groups of 20 each, the functional cosmetic composition of each of Examples 1 and 2 was applied, and then, the skin moisturizing ability was measured using a Corneometer (Corneometer CM 820, Courage+Khazaka electronic GmbH, Germany) before application and after 2 and 4 weeks of application. The measurement was conducted in a constant temperature and humidity room with an indoor temperature of 24±2° C. and a relative humidity of 40±2° C., and the average value obtained by measuring three times under each condition was used. To show the resulting values, the rates of increase in electrodermal activity after 2 weeks and 4 weeks of application are shown in Table 5 based on the electrodermal activity before the initial application of the cosmetic composition of each of Examples 1 and 2 as 100%.

TABLE 5

|  | Rate of increase (%) | | |
| --- | --- | --- | --- |
|  | Before application | After 2 weeks | After 4 weeks |
| Example 1 | 100 | 113 | 128 |
| Example 2 | 100 | 119 | 140 |

As shown in Table 5, it was confirmed that the functional cosmetic composition according to the present invention had an excellent skin moisturizing effect.

3. Skin Elasticity Analysis

For forty adult women aged 30 to 40 years, the functional cosmetic composition of each of Examples 1 and 2 was applied to the face twice daily for four weeks. The subjects were divided into two groups of 20 each, the functional cosmetic composition of each of Examples 1 and 2 was applied, and after 4 weeks, the elasticity of the facial area was measured using a Cutometer (SEM474, Courage+Khazaka electronic GmbH, Germany), which may measure skin elasticity. The measurement was performed three times for each condition, and the average value thereof was used.

To show the resulting values, the improvement of skin elasticity after 4 weeks of application is shown in Table 6 based on the elasticity before the initial application of the functional cosmetic composition of each of Examples 1 and 2, and the result value represents the properties of skin viscoelasticity measured by a skin elasticity meter.

TABLE 6

| | Improvement of skin elasticity (%) |
|---|---|
| Example 1 | 72.5 |
| Example 2 | 87.3 |

As shown in Table 6, it was confirmed that the functional cosmetic composition according to the present invention had an excellent skin elasticity improvement effect.

As set forth above, the functional cosmetic composition according to the present invention has the effect of improving skin moisturizing ability and increasing skin elasticity.

What is claimed is:

1. A skin elasticity and skin moisturizing functional cosmetic composition comprising a Boryeong mud extract,
wherein the cosmetic composition contains 8 to 12 parts by weight of a Boryeong mud extract, 1 to 3 parts by weight of a *Sophora japonica* flower extract, 1 to 3 parts by weight of a *Centaurea cyanus* flower extract, 1 to 3 parts by weight of a *Matricaria* flower extract, 1 to 3 parts by weight of a *Pancratium maritimum* extract, 0.8 to 1.2 parts by weight of a pear extract, 0.8 to 1.2 parts by weight of a Japanese apricot extract, 0.8 to 1.2 parts by weight of a cypress leaf extract, 0.8 to 1.2 parts by weight of a gold, 2 to 4 parts by weight of glycerin, 0.8 to 1.2 parts by weight of niacinamide, 0.8 to 1.2 parts by weight of sodium chloride, 0.8 to 1.2 parts by weight of butylene glycol, 0.8 to 1.2 parts by weight of hexylene glycol, 0.8 to 1.2 parts by weight of 1,2-hexanediol, 0.8 to 1.2 parts by weight of caprylyl glycol, 1 to 3 parts by weight of allantoin, 1 to 3 parts by weight of citric acid, 0.8 to 1.2 parts by weight of disodium EDTA, 0.8 to 1.2 parts by weight of pentylene glycol, 0.8 to 1.2 parts by weight of sodium hyaluronate, 0.8 to 1.2 parts by weight of polyhydroxystearic acid, 0.8 to 1.2 parts by weight of ethylhexylglycerin, 0.8 to 1.2 parts by weight of hydrolyzed sodium hyaluronate, 0.8 to 1.2 parts by weight of limonene, and 56 to 60 parts by weight of purified water, and
wherein the cosmetic composition further contains 3 to 7 parts by weight of a multifunctional extract, and
the multifunctional extract is prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of purified water, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract.

2. The skin elasticity and skin moisturizing functional cosmetic composition of claim 1, wherein the cosmetic composition further contains 3 to 7 parts by weight of a multifunctional extract,
the multifunctional extract is prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and staying at a temperature of 6 to 10° C. for 13 to 17 hours; after the staying, performing filtration to obtain a filtrate, mixing 48 to 52 parts by weight of the filtrate and 48 to 52 parts by weight of purified water, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract, and
the aged extract is prepared by performing: washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and staying at a temperature of 18 to 22° C. for 5 to 7 hours; after the staying, heating the mineral mixture at a temperature of 88 to 92° C. for 11 to 13 hours and performing extraction through ultrasonic irradiation; and after the extraction, performing filtration to obtain a filtrate.

3. The skin elasticity and skin moisturizing functional cosmetic composition of claim 1, wherein the cosmetic composition further contains 3 to 7 parts by weight of a multifunctional extract,
the multifunctional extract is prepared by performing: pretreating *Tubocapsicum anomalum*, oregano, and *Psalliota campestris* by performing washing and steaming at a temperature of 68 to 72° C. for 2 to 4 hours; mixing 48 to 52 parts by weight of a mixture obtained by mixing the pretreated *Tubocapsicum anomalum*, oregano, and *Psalliota campestris* at a weight ratio of 1:1:1 and 48 to 52 parts by weight of an aged extract, and staying at a temperature of 6 to 10° C. for 13 to 17 hours; after the staying, performing heating to a temperature of 68 to 72° C. and then performing cooling; after the cooling, adding 8 to 12 parts by weight of the aged extract, adding 0.8 to 1.2 parts by weight of a *Saccharomyces bayanus* strain, and then performing fermentation at a temperature of 31 to 35° C. for 6 to 8 days; after the fermentation, performing filtration to obtain a fermented product, adding 8 to 12 parts by weight of the fermented product and 88 to 92 parts by weight of purified water, and performing extraction at a temperature of 118 to 122° C. for 8 to 10 hours to prepare an extract; and concentrating under reduced pressure and freeze-drying the extract, and the aged extract is prepared by performing: washing scoria and olivine and heat-treating the washed scoria and olivine at a temperature of 138 to 142° C.; mixing 33 to 37 parts by weight of minerals obtained by mixing the heat-treated scoria and olivine at a weight ratio of 1:1 and 63 to 67 parts by weight of purified water to prepare a mineral mixture; crushing the minerals in the mineral mixture to powder the minerals and staying at a temperature of 18 to 22° C. for 5 to 7 hours; after the staying, heating the mineral mixture at a temperature of 88 to 92° C. for 11 to 13 hours and performing extraction through ultrasonic irradiation; and after the extraction, performing filtration to obtain a filtrate.

* * * * *